United States Patent [19]
Cox et al.

[11] Patent Number: 5,136,424
[45] Date of Patent: Aug. 4, 1992

[54] BINARY OPTICAL ELEMENT FOR AN OPTICAL DISK READ/WRITE HEAD

[75] Inventors: J. Allen Cox, New Brighton; Bernard S. Fritz, Eagan, both of Minn.

[73] Assignee: Honeywell Inc., Minneapolis, Minn.

[21] Appl. No.: 560,483

[22] Filed: Jul. 23, 1990

Related U.S. Application Data

[63] Continuation-in-part of Ser. No. 374,379, Jun. 30, 1989, abandoned.

[51] Int. Cl.[5] .............. G02B 5/30; G02B 5/18; G11B 7/12
[52] U.S. Cl. ................... 359/394; 359/572; 369/44.23
[58] Field of Search ........... 350/400, 3.72; 369/46, 369/109, 110, 111, 112, 44.23; 359/569, 572

[56] References Cited
U.S. PATENT DOCUMENTS

| | | | |
|---|---|---|---|
| 4,779,253 | 10/1988 | Getreuer et al. | 369/109 |
| 4,779,943 | 10/1988 | Tatsuno et al. | 350/3.7 |
| 4,794,585 | 12/1988 | Lee | 369/44.23 |
| 4,799,210 | 1/1989 | Wilson et al. | 369/110 |

Primary Examiner—Bruce Y. Arnold
Assistant Examiner—James Phan

[57] ABSTRACT

A ultra-compact optical readout device utilizing a binary optical element that provides a wide separation between diffraction efficiency peaks of different polarization modes so that sending and returning light can take distinct paths at the light source and detector, respectively, and also take the same paths at other regions of the device, enabling the simultaneous emission and detection of light for reading information from optical media. The specially designed contour of the binary optical diffracting element also provides the device with focussing capabilities without the need for a cylindrical lens at the detector or light source.

1 Claim, 4 Drawing Sheets

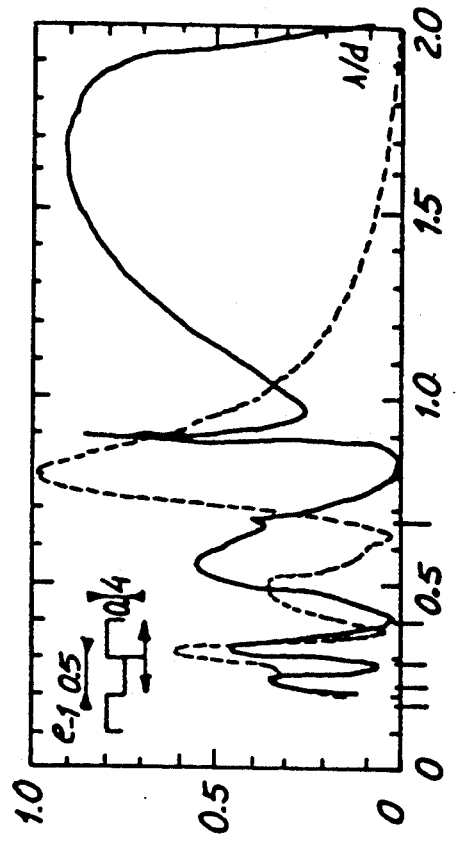
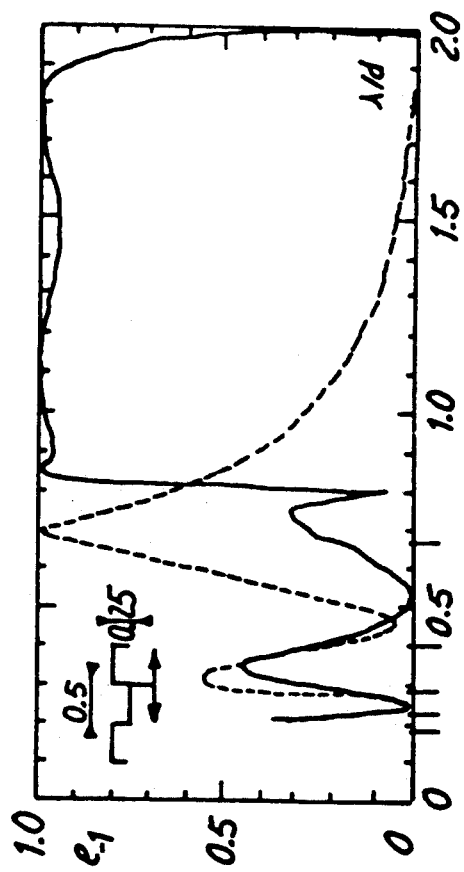
Fig. 1e
Fig. 1f

BINARY OPTICAL ELEMENT FOR AN OPTICAL DISK READ/WRITE HEAD

This application is a continuation-in-part, of U.S. patent application Ser. No. 07/374,379, filed Jun. 30, 1989 (abandoned).

FIELD OF THE INVENTION

The present invention pertains to optical disk memory systems and, particularly, to optical disk read/write heads. More particularly, the invention pertains to optical disk heads using reflective diffracting optical elements.

BACKGROUND OF THE INVENTION

Many of the optical memory disk systems in the related art have read/write heads that are relatively large and bulky for the desired performance characteristics of today's systems. Also such systems are quite expensive. A typical optical system head may have three or four lenses, a polarizing beam splitter, four prisms bonded together as a unit, and quarter-wave length plate, among other parts. Despite the disadvantages, such heads may have approximately 80 percent signal throughput.

In an effort to address some of the above-mentioned disadvantages, one company has developed a compact read/write optical head that incorporates a transmissive holographic element which replaces the beam splitter and some of the optical elements in the larger systems. The major components of this device are a laser diode, a solid state detector, and a holographic element. The immense disadvantage of this compact head is that the signal throughput is very low, that is, approximately one percent. Such a typical device is disclosed in U.S. Pat. No. 4,731,772, entitled "Optical Head Using Hologram Lens for Both Beam Splitting and Focus Error Detection Functions."

SUMMARY OF THE INVENTION

The present invention is an optical read/write head that is very compact, lightweight and inexpensive, and has a high signal throughput that should approximate 40 percent. A reflective diffracting (binary) optical element is used in the optical head. The essence of the element is a planar metallic mirror containing a deep lamellar fringe grating. The lamellar grating provides very high diffraction efficiency. Selection of the grating period leads to operation near the second so-called Wood anomaly. This grating operation results in a wide separation between the diffraction efficiency peaks of the TE and TM polarizations which, in turn, gives rise to a dramatic increase in signal throughput. Additionally, the use of an appropriate fringe pattern to define the lamellar contours permits the addition of astigmatism to the wavefront for focus control and thereby eliminates the need for an extra cylindrical lens. This binary element is a high quality diffractive element consisting of a continuous, segmented surface relief structure, which can be fabricated by means of standard lithographic and dry etch techniques common to the microelectronics industry. The element may be reproduced from a master binary element. Such reproduction paves the way for dependable low cost and high volume productivity.

The invention has application as a lightweight, compact and low cost optics for WORM (write once, read many) optical storage disk systems.

BRIEF DESCRIPTION OF THE DRAWINGS

FIGS. 1a–f are graphs showing reflective diffraction efficiency in the first order versus the wavelength/grating period for TE and TM polarizations.

DESCRIPTION OF THE PREFERRED EMBODIMENT

The crux of the present invention is a particular application of the binary element in an optical head specifically designed to incorporate the element with ensuing high signal throughput of the head. Such application involves a binary grating element design which results in a high reflectance in zero order for one polarization (i.e., TM) and in first order for the other polarization (i.e., TE). The occurrence of this effect in a lamellar (binary) diffraction grating was first observed by R. W. Wood in 1902. Shortly after, this effect was dealt with from a theoretical perspective by Lord Rayleigh. FIGS. 1a–f are graphs that show examples of diffraction efficiency in the first order versus the wavelength/grating period for TE (dashed line) and TM (solid line) polarizations with a lamellar grating. The abscissa of each graph is marked by five arrows denoting the location of the first five Rayleigh points for each grating. The Rayleigh points occur in order from right to left in each graph. In the neighborhood of each Rayleigh point, there is a sharp separation in reflectivity between the two polarizations. These regions around the Rayleigh points are referred to as the Wood anomalies. The grating of the present invention is designed to function just prior to the second Rayleigh point where only zero and first diffraction orders propagate and the remaining orders are evanescent (i.e., non-propagating).

Figure 1A:
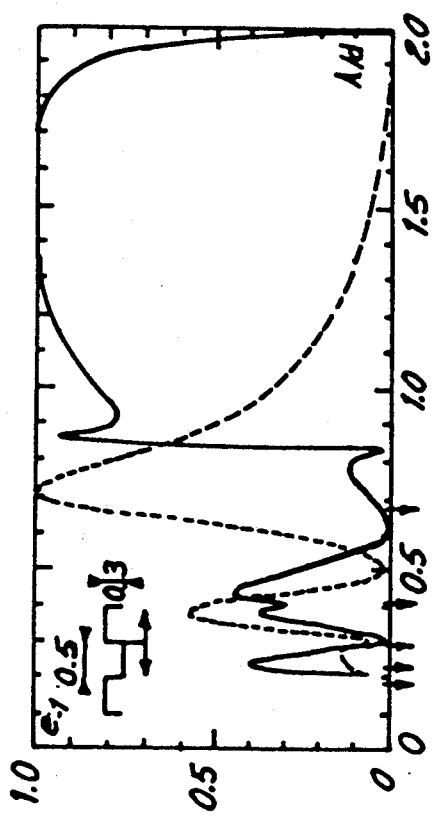
Figure 1B:
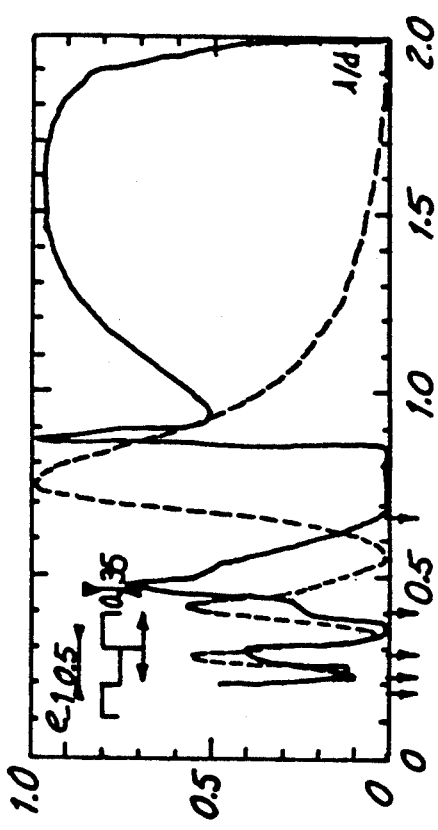
Figure 1C:
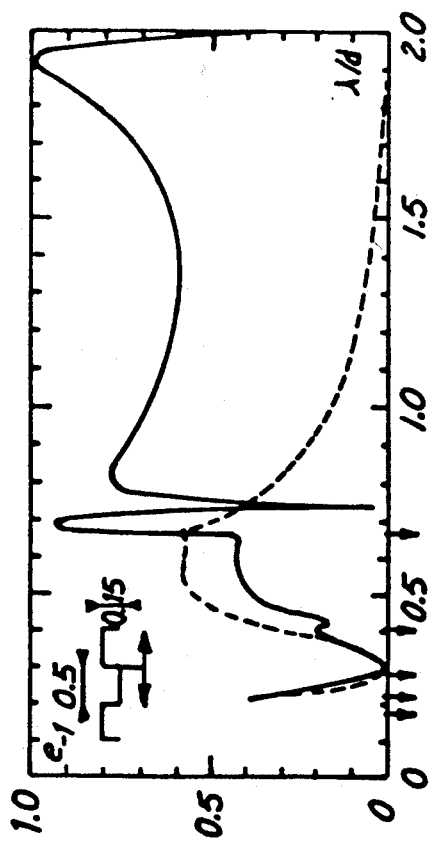
Figure 1D:
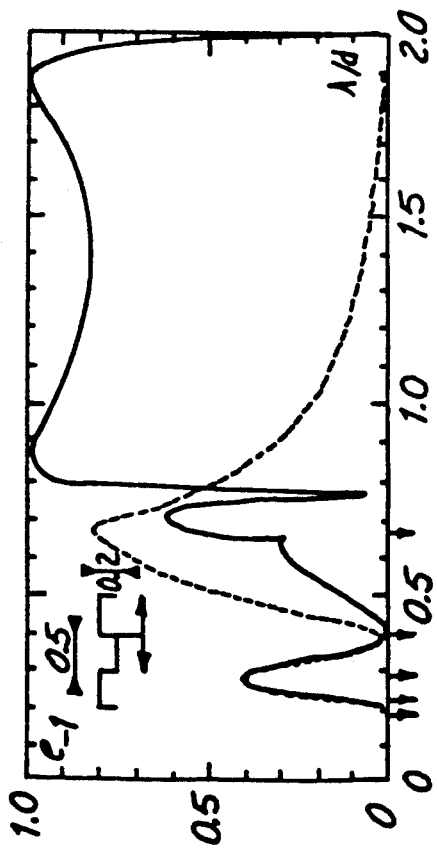
Figure 2B:
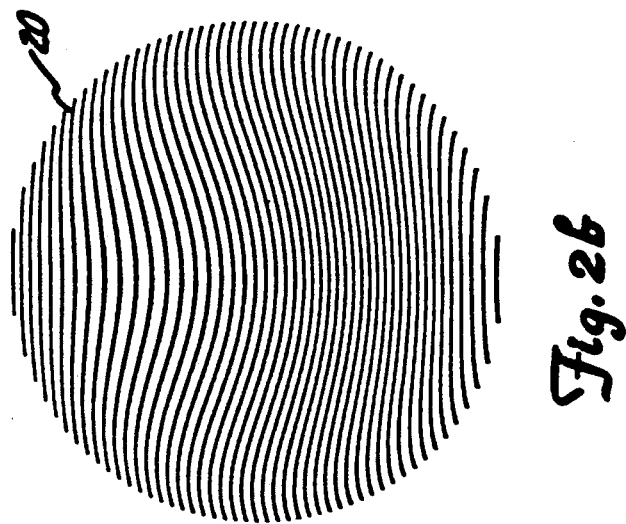
FIG. 2 represents the operation of the invention from the optical fiber/laser diode source to the media.
Figure 2A:
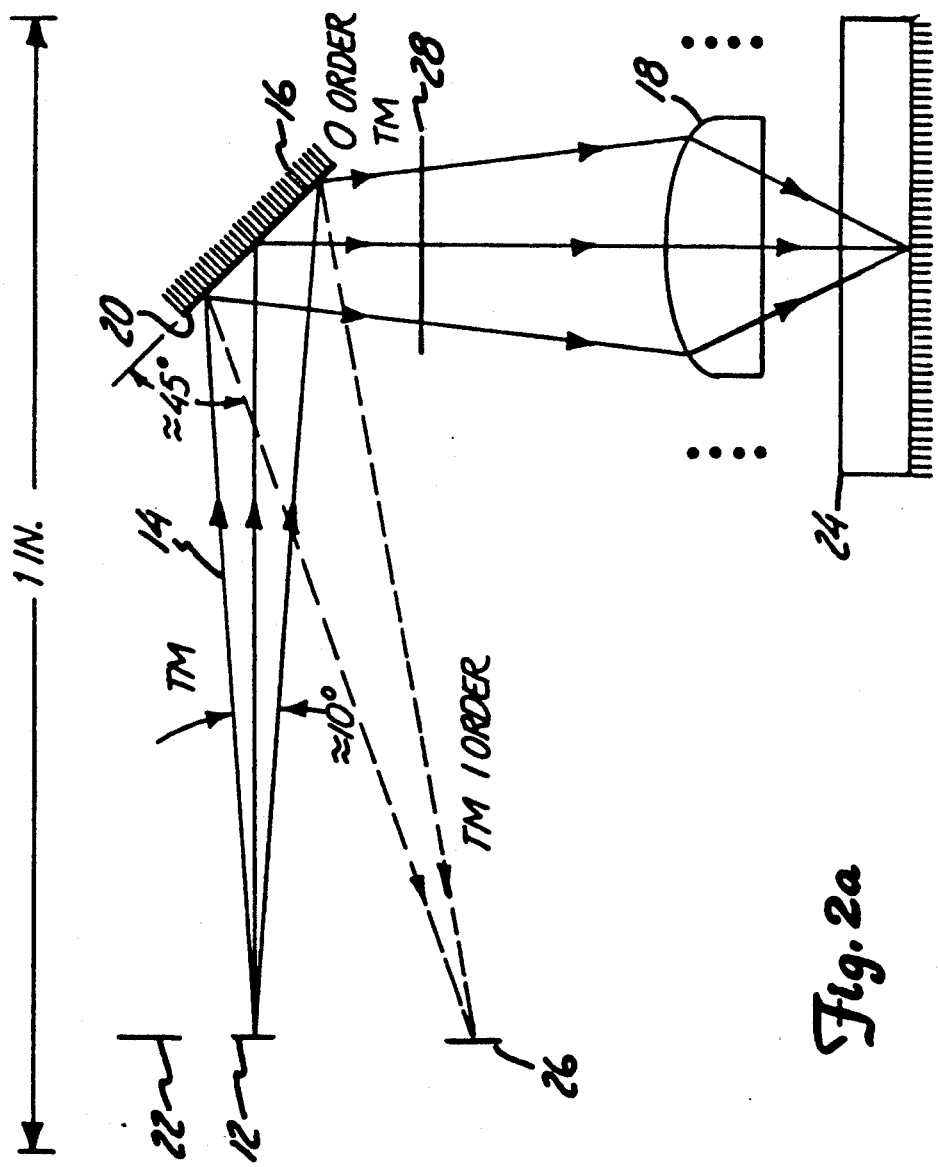
Figure 3B:
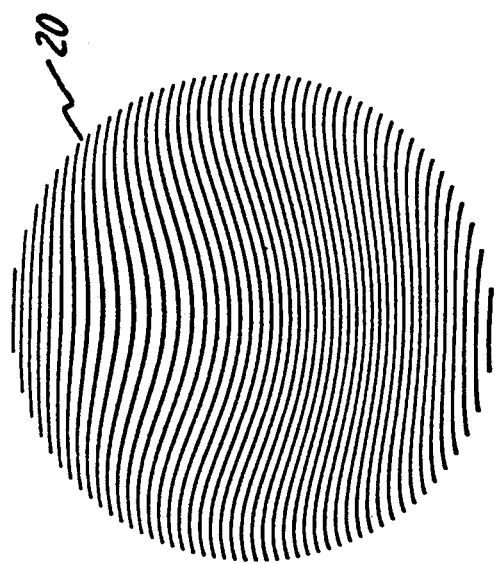
FIG. 3 represents operation of the invention from the media to the quad-detector.
Figure 3A:
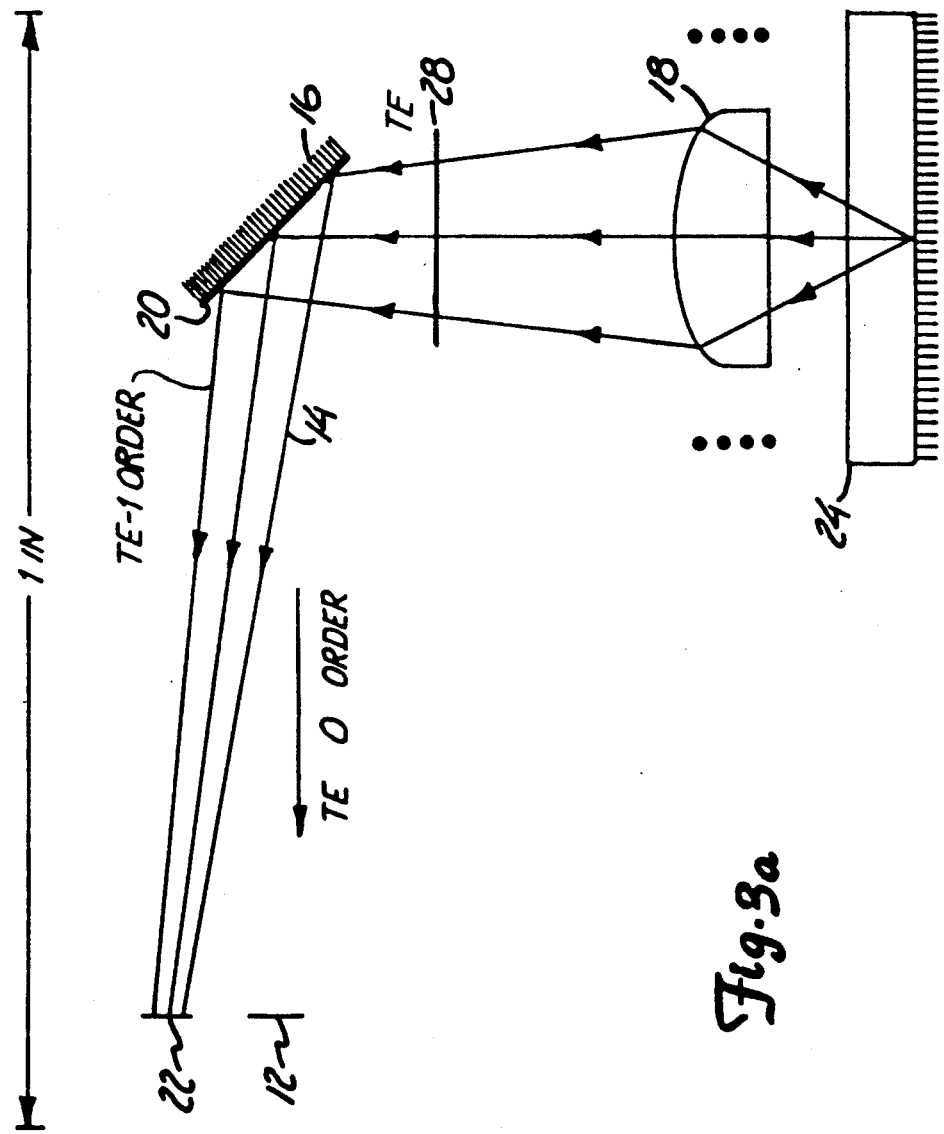

FIGS. 2 and 3 reveal the layout geometry and principal components of the invention. Laser source 12 may be a laser diode or a fiber optic having a appropriate modification for individual beam divergence. Laser source 12 is designed and adjusted to emit linearly polarized radiation of a 0.78 micrometer wavelength, diverging with conical angle of approximately 10 degrees as illustrated in FIG. 2. Source 12 is oriented so that laser beam 14 is polarized in the TM (transverse magnetic) mode measured with respect to the binary reflective element. In this mode, the oscillating magnetic field vector is perpendicular to the plane of the paper in FIG. 2. Binary reflective element 16 is positioned at about 45 degrees with respect to the direction of source 12 and to that of pickup lens 18. Front face 20 of element 16 is etched to form a lamellar diffraction grating having an array of fringes with a surface cross-section consisting of rectangular peaks and grooves (thereby giving rise to the name "binary grating"). Unlike most other gratings, binary grating 16 has curved fringes on face 20, rather than parallel straight lines. The curved fringe pattern adds optical "power" to element 16 and effectively causes element 16 to functionally behave like a cylindrical mirror.

This is the same as a computer generated hologram wherein the diffraction phase pattern is mathematically constructed to create astigmatism. Calculations of astigmatism and reflection are made through the use of a commercially available optical design computer program CODE V. This program is one of several in the market of programs. The program provides the specifications of fringe contours in the form of $C_{11}X^2 + C_{12}XY + C_{21}Y^2 + C_{22}X^4 + \ldots$ The program also provides the numerical values for the constants $C_{11}, C_{12}, \ldots$ Determination of the reflectivities is obtained through the use of another available program entitled "DIFFRACT." This program involves providing numerical solutions to electromagnetic field equations. There is electromagnetic interaction of the wavefront with the diffractive structure. The fringe contours for the present embodiment are in the form of $C(X^2 + 3Y^2)$.

Binary element 16 is made beginning with the generation of the pattern on a binary disk using state-of-the-art equipment used to generate lithographic mask patterns for integrated circuits. Standard pattern generators in the art use either a laser, electron or ion beams to trace the pattern in a positive resist on the surface of a glass substrate. The pattern generated on the mask is subsequently transferred to a resist-coated substrate and given a reflective coating to form the reflective and diffractive optical element. A layer of resist is spun onto the substrate to a thickness corresponding to the desired depth of the final surface relief grating. Then, a thin layer (500 angstroms) of chrome-aluminum is sputtered and on top of this, a thin layer (1000 Å) of resist is applied. A conformable mask, made by contact printing with the e-beam generated mask, is contact printed under vacuum on the top thin layer of resist. The exposed substrate is then wet-etched so that the binary pattern is transferred to the top thin layer of metal. The substrate is then reactive ion etched in an oxygen plasma which selectively etches the resist, leaving the remaining metallization intact. Reactive ion etching is a highly anisotropic process, so that the high edge acuity of the desired rectangular profile is preserved. The final step of the process is to evaporate a thin film of gold onto the relief pattern to achieve the high conductivity necessary for efficient diffraction. During evaporation, the substrate is rotated between approximately plus or minus 45 degrees to assure uniform coating of the side walls and corners.

In the present invention, the fringe contours are designed to add astigmatism to the wavefront in order to provide an energy distribution at quad-detector 22 which is sensitive to focus. Thus, the astigmatism feature provides for focus control and eliminates the need for a cylindrical lens that is needed in a conventional design.

Binary element 16 has front face 20 designed with a grating depth and period to operate near the second Rayleigh point. In this configuration, only the zero (i.e., specular) and first orders propagate in a fashion such that the TM polarization has a high efficiency in the zero order and TE polarization has a high efficiency in the first order. Source 12 is positioned so that element 16 reflects the initial source radiation of a TM polarization in the zero order angle with respect to the position of element 16 and lens 18. Detector 22 is positioned so that it receives the radiation of a TE polarization in the first order reflected by element 16 from optical media 24 through lens 18. Both orders of radiation are measured relative to a 45 degree incident angle of radiation to element 16. Optional power monitor 26 may be added provided the grating of element 16 is designed to give a small first order contribution of reflected radiation and monitor is located at the first order angle.

In operation, binary grating element 16 reflects the incident TM polarized radiation with high efficiency in the zero order onto quarter-wave plate 28 in FIG. 2. Upon transmission through quarter-wave plate 28, the radiation beam is converted from linear TM polarization into left circular polarization. The diverging beam is then collected and focused onto optical storage media 24 by pickup lens 18. The intensity of the radiation reflected by media 24 depends on the information content encoded into media 24. The reflected beam undergoes a phase shift of 180 degrees and thus propagates as right circularly polarized light. The returning beam in FIG. 3 is converted into linear TE polarized radiation by quarter-wave plate 28. Due to the Wood anomaly, the beam is reflected by binary grating element 16 with high efficiency in the first order to detector 22. The radiation at detector 22 is decoded and any needed focus is determined and appropriate focus adjustment signals are sent to pickup lens 18.

A preferred binary grating element 16 is an element etched in fused quartz and coated with silver via evaporation. The present embodiment of the present invention utilizes radiation having a wavelength of 0.78 micrometers. The precise specification of the fringe contours depends on the exact details of source 12, quad-detector 22, and the associated geometry. In the design of element 16, sufficient astigmatism may be added to face 20 as to sufficiently affect the wavefront of the radiation. Two other parameters to be determined are the depth and the average period of the grating. The average period is determined from the requirements that only the zero and first orders propagate, that the angular separation between these orders be minimized, and that the device operate near a Rayleigh point. These requirements are best determined for a second order angle that just exceeds 90 degrees.

From the grating equation, $$\sin\phi_m = \sin\phi_o + m\,\lambda/L$$

where m is the diffraction order, $\phi_o$ is the zero order incident angle, $\phi_m$ is the angle of the m diffracted order, $\lambda$ is the wavelength, and L is the grating period, L is found to be 0.9138 micrometers. Also, for good reflectivity, the grating depth is equal to one-half of the wavelength.

From these grating parameters, the reflectivities can be calculated in the zero and first orders for TM and TE polarizations using the computer models. The grating reflectivity for the TM polarization in the zero diffraction order is 54.2 percent and in first diffraction order it is 2.4 percent. The grating reflectivity for the TE polarization in the Zero diffraction order is 14.8 percent and in the first diffraction order it is 80.3 percent. These contrasting reflectivities assure satisfactory operation of the invention as described above. FIGS. 1a–f indicate that better separation between the polarizations can be obtained with greater design optimization.

We claim:

1. A compact optical readout device for reading data from optical media, comprising:
   a light source;
   a detector;
   a reflector positioned so that light from said light source impinges said reflector at an angle between 0 and 90 degrees relative to a possible path of light from said source, wherein the possible path connects said light source and said reflector;

a fractional wavelength plate positioned between said reflector and the optical media; and a lens positioned between said fractional wavelength plate and the optical media; and wherein:

said light source emits light in a linear TM polarization;

said reflector is a binary reflector element which reflects, at a highest efficiency angle which is a zero order angle, the light in the linear TM polarization from said light source;

said fractional wavelength plate converts the light reflected by said reflector from the linear TM polarization into a left circular polarization;

said lens focuses the light converted to a left circular polarization, onto the optical media;

the optical media reflects the light, thereby reconverting it to right hand circularly polarized light and spatially modulating the intensity thereof corresponding to information encoded on the optical media, through said lens to said fractional wavelength plate;

said fractional wavelength plate converts the light of the right circular polarization to that of a linear TE polarization;

said reflector reflects, at a highest efficiency angle which is a plus or minus first order angle, the light having the linear TE polarization from said fractional wavelength plate;

said detector is positioned to receive the light reflected at the plus or minus first order angle of the linear TE polarization mode;

said reflector is designed with a grating contour to introduce an astigmatism into a particular energy distribution representing a particular focus at said detector which is focus sensitive due to energy distribution thereby providing for focus control;

said reflector is designed to operate at a second Rayleigh point of Woods anomaly;

said fractional wavelength plate is a quarter wavelength plate; and said detector detects varying intensity of the detected light corresponding to information encoded in the optical media.

* * * * *

UNITED STATES PATENT AND TRADEMARK OFFICE
CERTIFICATE OF CORRECTION

PATENT NO. : 5,136,424
DATED : August 4, 1992
INVENTOR(S) : J. Allen Cox et al.

It is certified that error appears in the above-identified patent and that said Letters Patent is hereby corrected as shown below:

Column 4, line 42, delete "$\sin\phi_m = \sin\phi_0 + m/L$ and insert -- $\sin\phi_m = \sin\phi_0 + m\lambda/L$ 

Column 4, line 45, insert " $\lambda$ " before, --is the wavelength,--

Signed and Sealed this

Fifth Day of October, 1993

Attest:

BRUCE LEHMAN

*Attesting Officer*     *Commissioner of Patents and Trademarks*